US005505100A

United States Patent [19]
Mitchell et al.

[11] Patent Number: 5,505,100
[45] Date of Patent: Apr. 9, 1996

[54] METHOD OF CONTROLLING INTERRUPTED SHIFTS FOR A POWERSHIFT TRANSMISSION

[75] Inventors: Randall M. Mitchell, Washington; Alan L. Stahl, Peoria, both of Ill.; James R. Talbott, Fitchburg, Mass.

[73] Assignee: Caterpillar Inc., Peoria, Ill.

[21] Appl. No.: 315,056

[22] Filed: Sep. 29, 1994

[51] Int. Cl.$^6$ .................................................. F16H 61/08
[52] U.S. Cl. ........................................................... 74/335
[58] Field of Search ............................................... 74/335

[56] References Cited

U.S. PATENT DOCUMENTS

| 3,922,933 | 12/1975 | Sakai et al. | 477/134 |
| 3,956,947 | 5/1976 | Leising et al. | 74/866 |

(List continued on next page.)

FOREIGN PATENT DOCUMENTS

| 0357184A1 | 3/1990 | European Pat. Off. . |
| 0196358B1 | 5/1990 | European Pat. Off. . |
| 0435377A3 | 7/1991 | European Pat. Off. . |
| 04353275A3 | 7/1991 | European Pat. Off. . |
| 0372073B1 | 2/1994 | European Pat. Off. . |
| 4017961 | 12/1990 | Germany . |
| 3407716 | 1/1993 | Germany . |
| 2212871 | 8/1989 | United Kingdom . |
| WO9102913 | 3/1991 | WIPO . |

OTHER PUBLICATIONS

Article from Off–Highway Engineering Magazine dated Apr. 1993 entitled "Transmission Control System for Bulldozers".
Article No. 820392 entitled "Electronic Control of Automobile Transmissions" by G. Pannier and A. Laport.
Article No. 820394 entitled "Microcomputer Controlled Automatic Transmission" by A. L. Miller.
Article No. 830880 entitled "Development of Nissan Microprocessor Controlled Four Speed Lockup Automatic Transmission" by I. Suga et al.
Article No. 840448 entitled "Electronic Control of a 4–Speed Automatic Transmission with Lock–Up Clutch" by M. Schwab.
Article No. 901154 entitled "Trends of Powertrain Control" by N. Narumi et al.
Article No. 901156 entitled "Electronically–Controlled Transmission Systems—Current Position and Future Developments" by M. Schwab.
Article No. 901156 entitled "Electronically–Controlled Transmission Systems—Current Position and Future Developments" by M. Schwab.
Article No. 901157 entitled "Advanced Controls for Heavy Duty Transmission Applications" by J. Bender and K. Struthers.
Article No. 901160 entitled "Powertrain Electronics—Progress on the Use and Development of the Computer Aided Gearshift Systems" by Bader.
Komatsu Technical Guide entitled "K–ATOMICS—Komatsu–Advanced Transmission with Optimum Modulation Control".
SAE Article 890528 entitled "The Chrysler A–604 Ultradrive 4–Speed Automatic Transaxle" by B. Martin and T. Nogle.
SAE Article No. 861050 entitled "Electronically Controlled Mechanical Automatic Transmission for Heavy Duty Trucks and Buses" by S. Tanaka.

(List continued on next page.)

*Primary Examiner*—Dirk Wright
*Attorney, Agent, or Firm*—David M. Masterson

[57] ABSTRACT

In one aspect of the present invention, a method for controlling an interrupted shift for a powershift transmission is disclosed. The method first determines which clutches are active and then classifies each of the active clutches. Thereafter, the method calculates the timing associated with the engagement and disengagement of the classified active clutches to result in a smooth transition to the final selected gear.

4 Claims, 10 Drawing Sheets

U.S. PATENT DOCUMENTS

| | | | |
|---|---|---|---|
| 4,208,929 | 6/1980 | Heino et al. | 74/731 |
| 4,414,863 | 11/1983 | Heino | 74/866 |
| 4,419,909 | 12/1983 | Opperud et al. | 74/856 |
| 4,653,350 | 3/1987 | Downs et al. | 74/864 |
| 4,707,789 | 11/1987 | Downs et al. | 364/424.1 |
| 4,724,939 | 2/1988 | Lockhart et al. | 192/3.3 |
| 4,836,057 | 6/1989 | Asayama et al. | 74/867 |
| 4,838,124 | 6/1989 | Hamano et al. | 74/866 |
| 4,841,815 | 6/1989 | Takahashi | 74/866 |
| 4,843,902 | 7/1989 | Patton et al. | 74/335 |
| 4,854,194 | 8/1989 | Kaneko et al. | 74/866 |
| 4,855,913 | 8/1989 | Brekkestran et al. | 364/424.1 |
| 4,875,391 | 10/1989 | Leising et al. | 74/866 |
| 4,953,679 | 9/1990 | Okino | 192/96 |
| 4,955,256 | 9/1990 | Kashihara et al. | 74/866 |
| 4,967,385 | 10/1990 | Brekkestran et al. | 364/571.03 |
| 4,967,611 | 11/1990 | Sugano | 74/868 |
| 4,967,620 | 11/1990 | Shimanaka | 74/866 |
| 4,968,999 | 11/1990 | Fodale et al. | 364/424.1 |
| 4,969,098 | 11/1990 | Leising et al. | 364/424.1 |
| 4,975,845 | 12/1990 | Mehta | 364/424.1 |
| 4,981,053 | 1/1991 | Yamaguchi | 74/866 |
| 4,982,620 | 1/1991 | Holbrook et al. | 74/731.1 |
| 4,989,470 | 2/1991 | Bulgrien | 74/335 |
| 4,991,455 | 2/1991 | Bulgrien | 74/336 R |
| 5,004,084 | 4/1991 | Mehr-Ayin et al. | 192/33 |
| 5,005,441 | 4/1991 | Narita | 74/866 |
| 5,005,444 | 4/1991 | Kimura et al. | 74/868 |
| 5,005,680 | 4/1991 | Satoh et al. | 192/3.55 |
| 5,007,308 | 4/1991 | Narita | 74/866 |
| 5,014,573 | 5/1991 | Hunter et al. | 74/866 |
| 5,014,575 | 5/1991 | Fujiwara et al. | 74/866 |
| 5,016,175 | 5/1991 | Baltusis et al. | 364/424.1 |
| 5,018,408 | 5/1991 | Bota et al. | 74/866 |
| 5,029,086 | 7/1991 | Yoshimura | 364/424.1 |
| 5,029,492 | 7/1991 | Kiuchi | 74/844 |
| 5,029,494 | 7/1991 | Lentz et al. | 74/866 |
| 5,033,328 | 7/1991 | Shimanaka | 74/866 |
| 5,035,312 | 7/1991 | Asayama et al. | 192/85 R |
| 5,036,718 | 8/1991 | Bulgrien | 74/335 |
| 5,036,730 | 8/1991 | Sakai et al. | 74/866 |
| 5,038,286 | 8/1991 | Asayama et al. | 364/424.1 |
| 5,038,636 | 8/1991 | Vukovich et al. | 74/866 |
| 5,046,174 | 9/1991 | Lentz et al. | 364/424.1 |
| 5,046,175 | 9/1991 | Lentz et al. | 364/424.1 |
| 5,046,176 | 9/1991 | Lin | 364/424.1 |
| 5,046,178 | 9/1991 | Hibner et al. | 364/424.1 |
| 5,050,456 | 9/1991 | Fukuda | 74/866 |
| 5,050,458 | 9/1991 | Vukovich et al. | 74/866 |
| 5,052,246 | 10/1991 | Yamaguchi | 74/866 |
| 5,053,960 | 10/1991 | Brekkestran et al. | 364/424.1 |
| 5,054,599 | 10/1991 | Marcott | 192/85 R |
| 5,056,639 | 10/1991 | Petzold et al. | 192/76 |
| 5,058,460 | 10/1991 | Hibner et al. | 74/867 |
| 5,063,813 | 11/1991 | Lentz | 74/866 |
| 5,063,814 | 11/1991 | Baba et al. | 74/866 |
| 5,067,084 | 11/1991 | Kau | 364/453 |
| 5,067,373 | 11/1991 | Kyohzuka et al. | 74/866 |
| 5,067,374 | 11/1991 | Sakai et al. | 74/866 |
| 5,069,084 | 12/1991 | Matsuno et al. | 74/844 |
| 5,070,747 | 12/1991 | Lentz et al. | 74/866 |
| 5,072,390 | 12/1991 | Lentz et al. | 364/424.1 |
| 5,085,105 | 2/1992 | Wakahara et al. | 74/866 |
| 5,101,943 | 4/1992 | Bulgrien | 192/3.63 |
| 5,113,720 | 5/1992 | Asayama et al. | 74/866 |
| 5,168,973 | 12/1992 | Asayama et al. | 192/85 R |
| 5,174,137 | 12/1992 | Kato et al. | 73/118.1 |
| 5,190,130 | 3/1993 | Thomas et al. | 192/32 |
| 5,209,141 | 5/1993 | Asayama et al. | 74/866 |
| 5,211,079 | 5/1993 | Runde et al. | 74/866 |
| 5,216,606 | 6/1993 | Lentz et al. | 364/424.1 |
| 5,224,577 | 7/1993 | Falck et al. | 192/92 |
| 5,249,481 | 10/1993 | Lasoen | 74/335 |
| 5,277,290 | 1/1994 | Lasoen | 74/335 |

OTHER PUBLICATIONS

SAE Article No. 890529 entitled "The All–Adaptive Controls for the Chrysler Ultradrive Transaxle" by M. Leising et al.

SAE Article No. 890530 entilted "Nissan Electronically Controlled Four Speed Automatic Transmission" by M. Shinohara et al.

SAE Technical Paper No. 861170 entitled "Digital Electronic Controls for Detroit Diesel Allison Heavy Hauling Transmissions" by R. C. Boyer.

SAE Technical Paper No. 861212 entitled "The Design and Development of A Four Speed Powershift Transmission . . . " by J. E. Goodbar et al.

SAE Technical Paper No. 880480 entitled "Borg–Warner Australia Model 85 Automatic Transmission" by E. Wilfinger and J. Thompson.

SAE Technical Paper No. 892000 entitled "A Study on Electro–Hydraulic Control for Automatic Transmission" by K. Hasunaka et al.

SAE Technical Paper No. 900550 entitled "Toyota ECT–i a New Automatic Transmission with Intelligent. . ." by T. Kondo et al.

SAE Technical Paper No. 901557 entitled "A Transmission Control System for Construction Machinery" by K. Kusaka and Y. Ohkura.

SAE Technical Paper No. 901592 entitled "Adaptive Electronic Tractor Shift Control System" by L. Ross and D. Panoushek.

SAE Technical Paper No. 910082 entitled "An Engine & Transmission Control System with New 16–bit Single Chip. . ." by S. Kuroyanagi et al.

SAE Technical Paper No. 910410 entitled "SCVT—A State of the Art Electronically Controlled Continuously Variable. . ." by S. Hirano et al.

SAE Technical Paper No. 910639 entitled "Analysis of a New Automatic Transmission Control System for Lexus LS400" by H. Taniguchi et al.

SAE Technical Paper No. 910750 entitled "Diesel Deposit Forming Tendencies—Microanalysis Methods" by J. Perez et al.

SAE Technical Paper No. 911831 entitled "User–Friendly Electronic Powershift Transmission Controls" by G. Bulgrien.

SAE Technical Paper No. 911880 entitled "New Kubota Midsize Farm Tractor" E. Shinohara et al.

SAE Technical Paper No. 911938 entitled "Improving Automatic Transmission Shift Quality by Feedback Control. . ." by Y. Narita.

Fig_2_

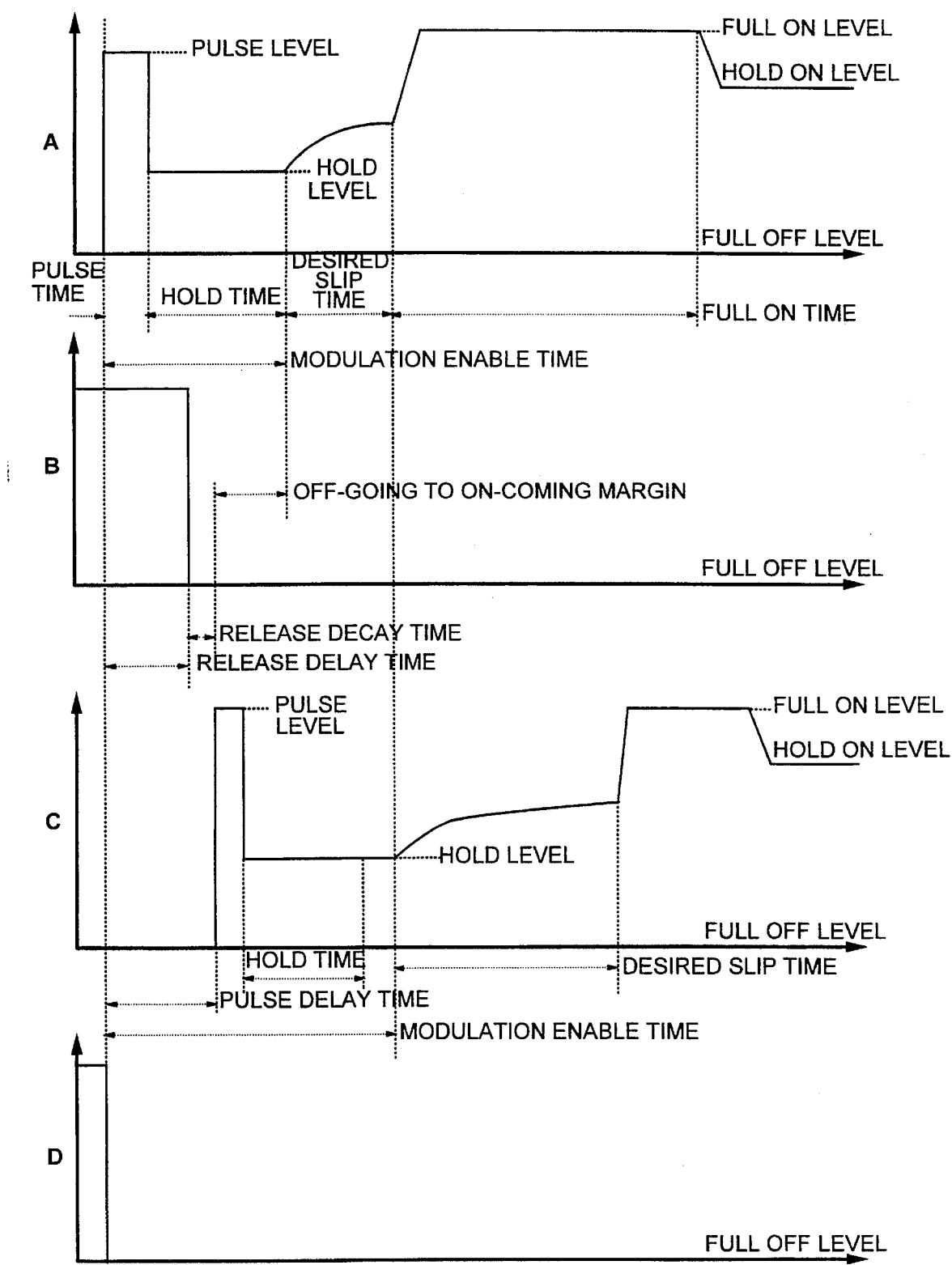
Fig-4-

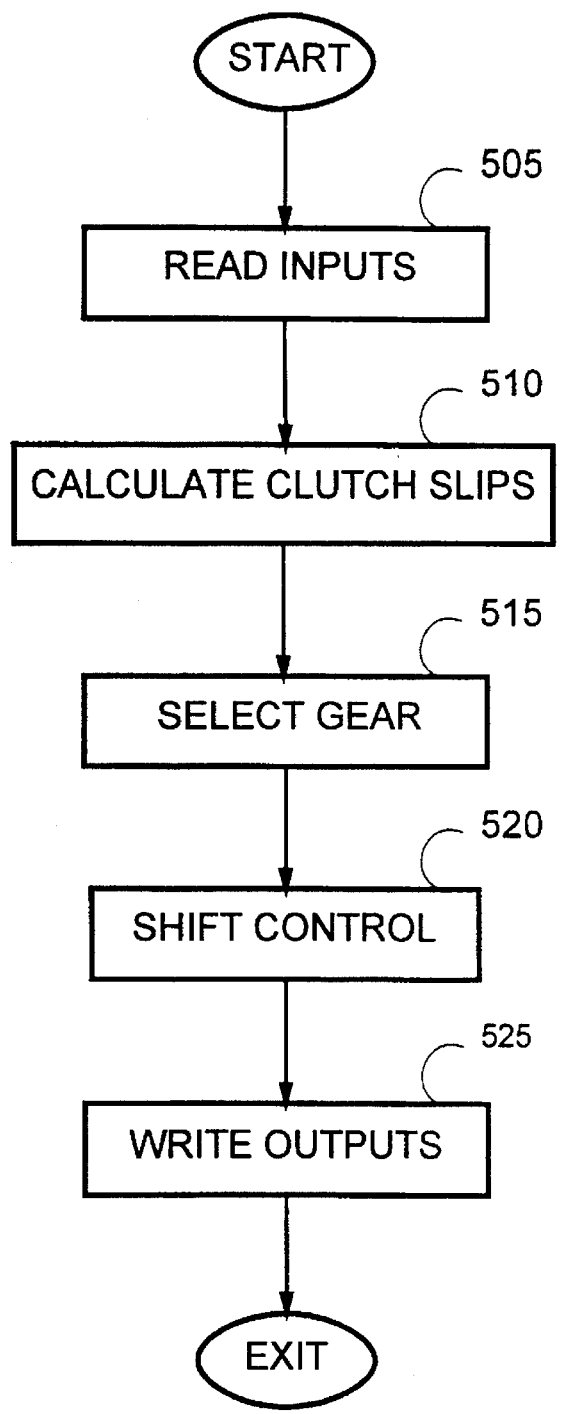
Fig-5-

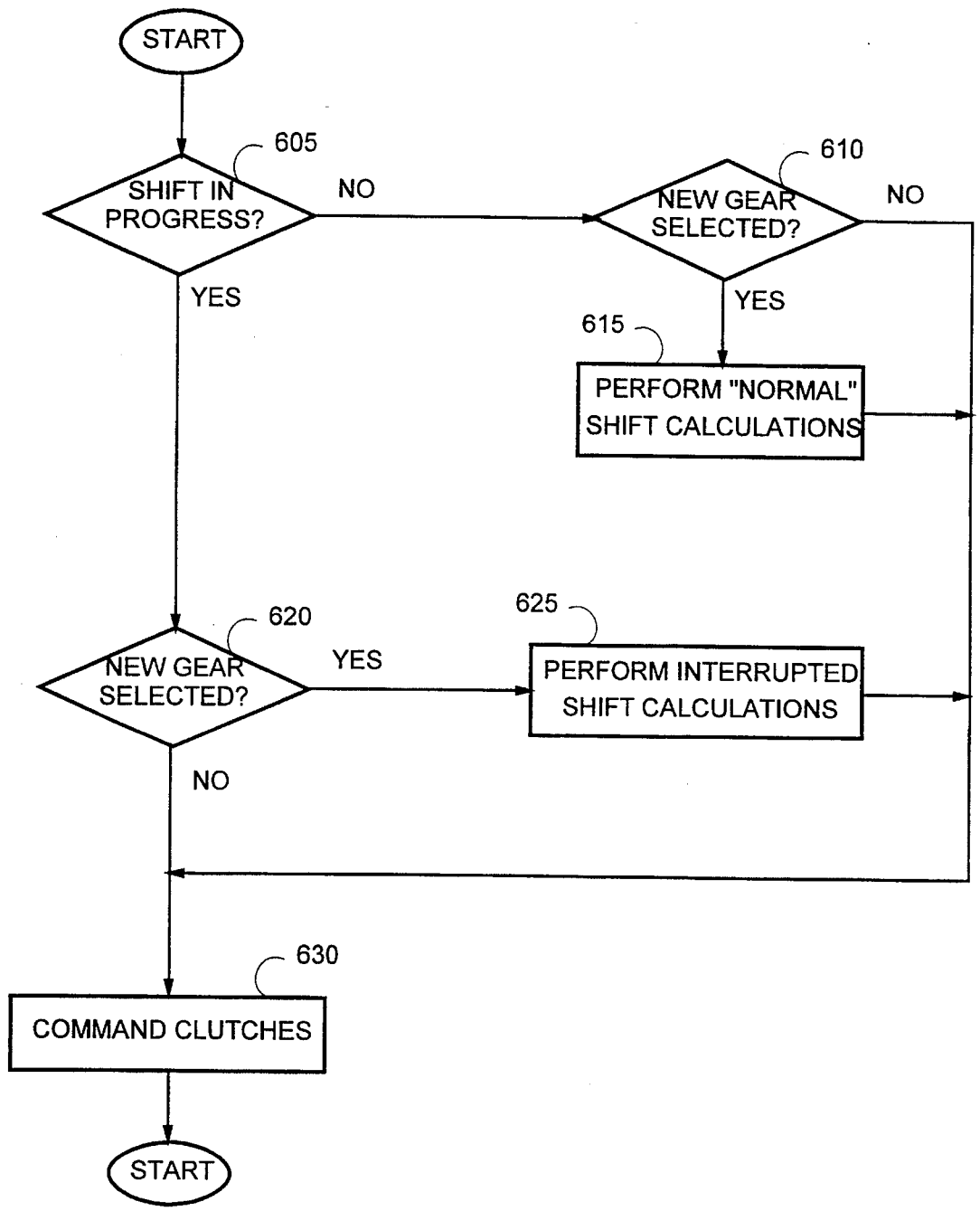
Fig_6_

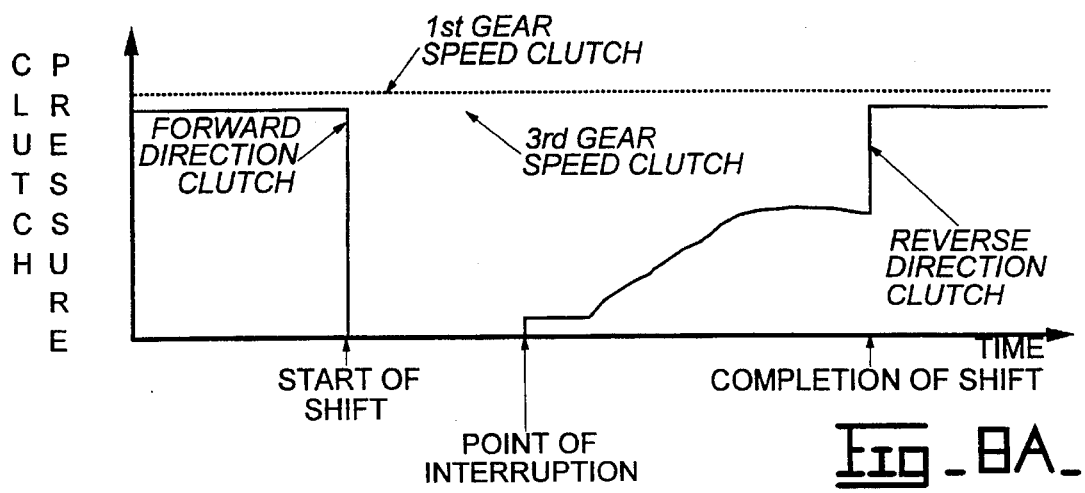
Fig-8A-
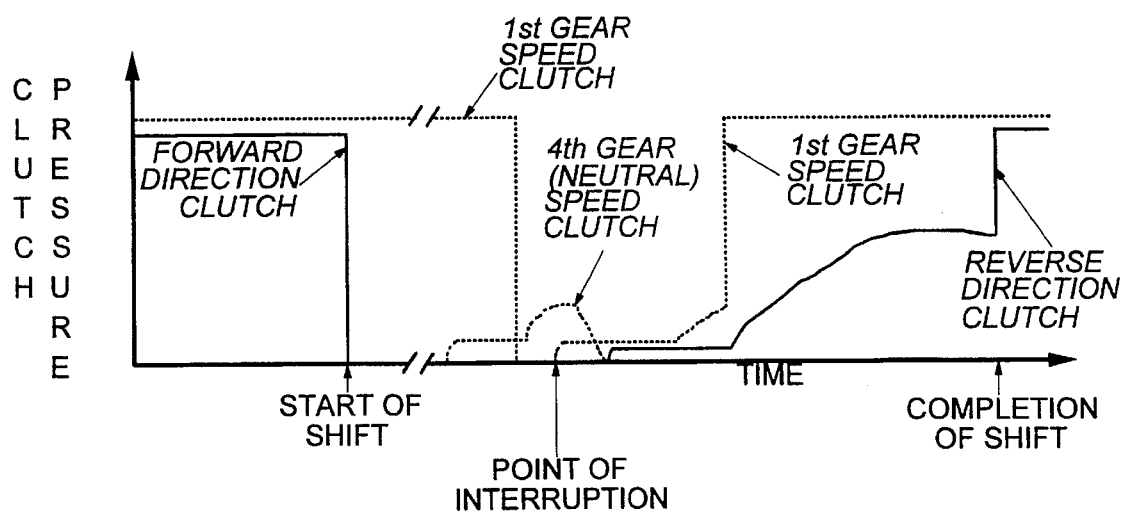
Fig-8B-

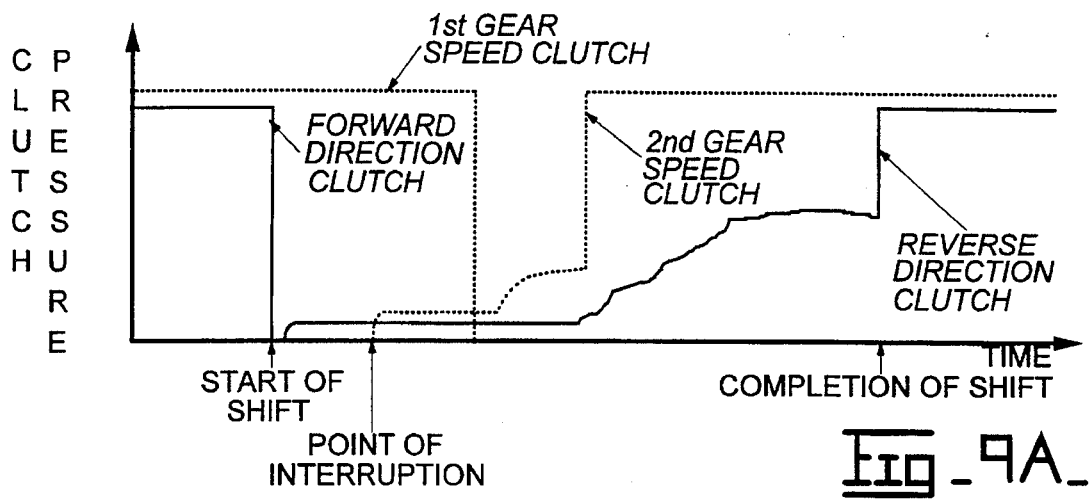
Fig-9A-
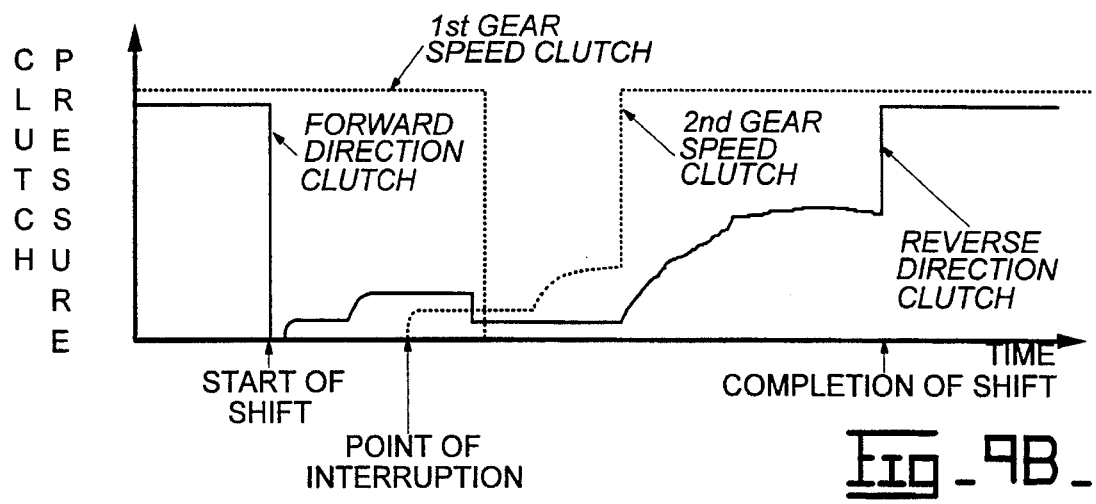
Fig-9B-

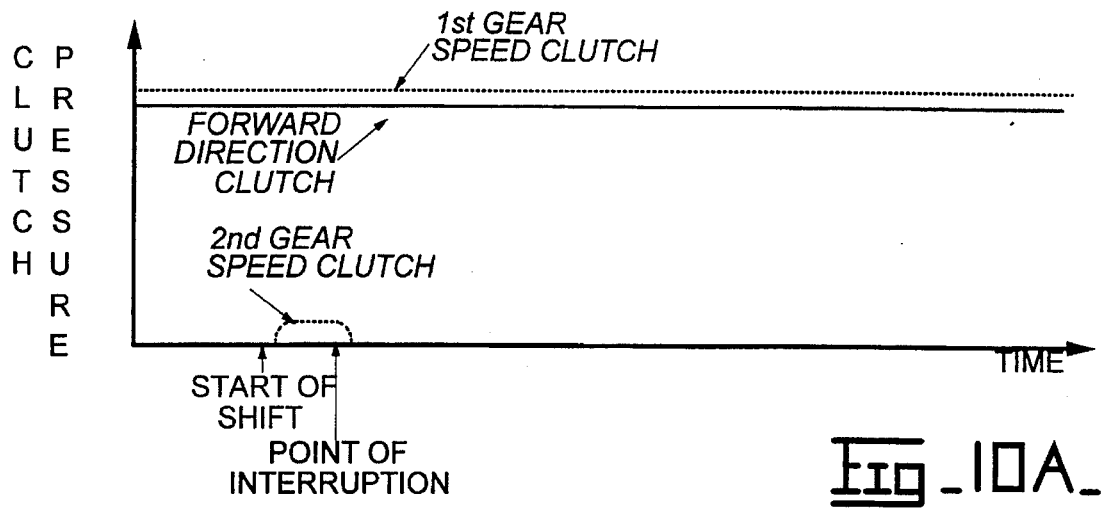
Fig_10A_
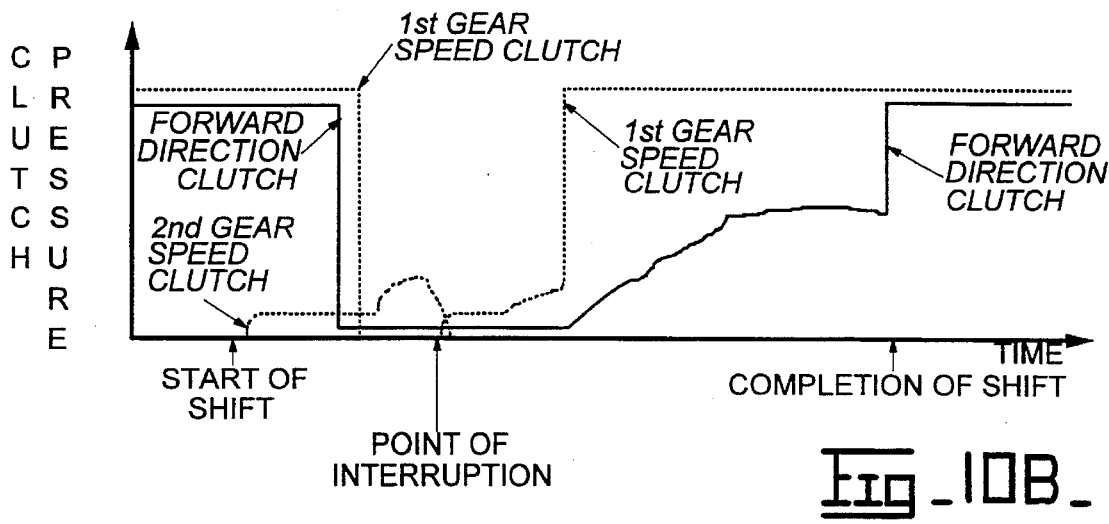
Fig_10B_
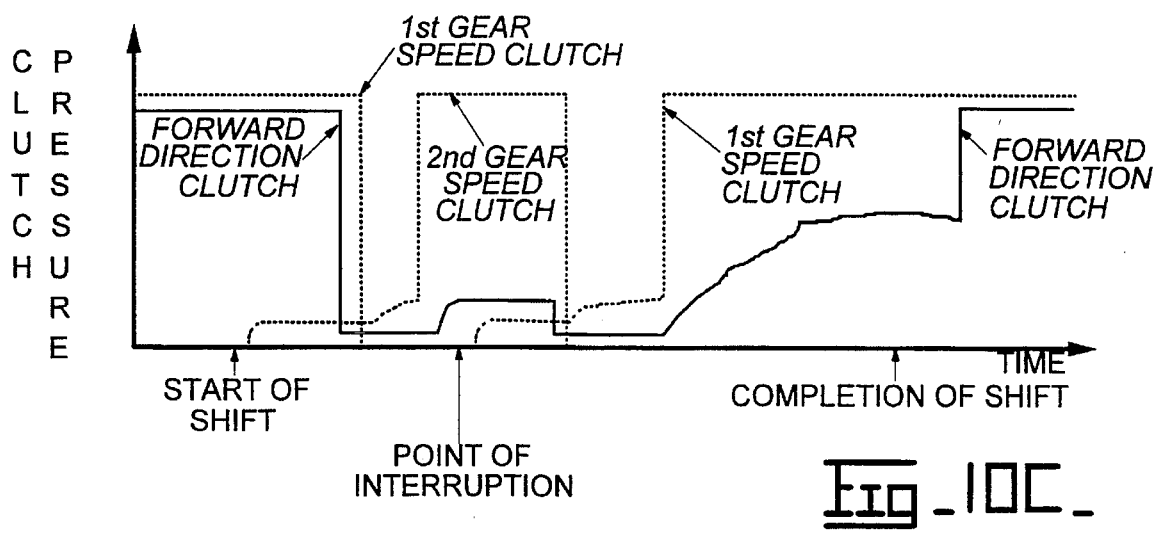
Fig_10C_

METHOD OF CONTROLLING INTERRUPTED SHIFTS FOR A POWERSHIFT TRANSMISSION

TECHNICAL FIELD

This invention relates generally to a method of controlling a shift in a powershift transmission and, more particularly, to a method of electronically controlling an interrupted shift of a powershift transmission.

BACKGROUND ART

Generally, a motor vehicle powershift transmission includes a number of gear elements coupling the input and output shafts, and a related number of clutches which are selectively engageable to activate gear elements for establishing a desired speed ratio between the input and output shafts. The clutch may be of the band or disk type.

For example, the input shaft may be connected to the engine through a fluid coupling, such as a torque converter, and the output shaft is connected directly to the vehicle drive. Shifting from one gear ratio to another involves releasing or disengaging the off-going clutches associated with the current gear ratio and applying or engaging the on-coming clutches associated with the desired gear ratio.

Shifts performed in the above manner are termed clutch-to-clutch shifts and require precise timing in order to achieve high quality shifting. However, if a shift to one gear ratio is suddenly interrupted with a shift to another gear ratio, the timing or sequence of engagement and disengagement of the clutches becomes even more critical to achieve high quality shifting.

DISCLOSURE OF THE INVENTION

In one aspect of the present invention, a method for controlling an interrupted shift for a powershift transmission is disclosed. The method first determines which clutches are active and then classifies each of the active clutches. Thereafter, the method calculates the timing associated with the engagement and disengagement of the classified active clutches to result in a smooth transition to the final selected gear.

BRIEF DESCRIPTION OF THE DRAWINGS

For a better understanding of the present invention, reference may be made to the accompanying drawings

FIGS. 2, 3, and 4 are timing charts illustrating clutch commands for various types of transmission shifts;

FIG. 5 is a flowchart illustrating the main loop of the program control of a transmission shift;

FIG. 6 is a flowchart illustrating the shift control of a transmission shift; and FIG. 7–10 are timing charts illustrating clutch pressures for various types of interrupted transmission shifts.

BEST MODE FOR CARRYING OUT THE INVENTION

Figure 1:
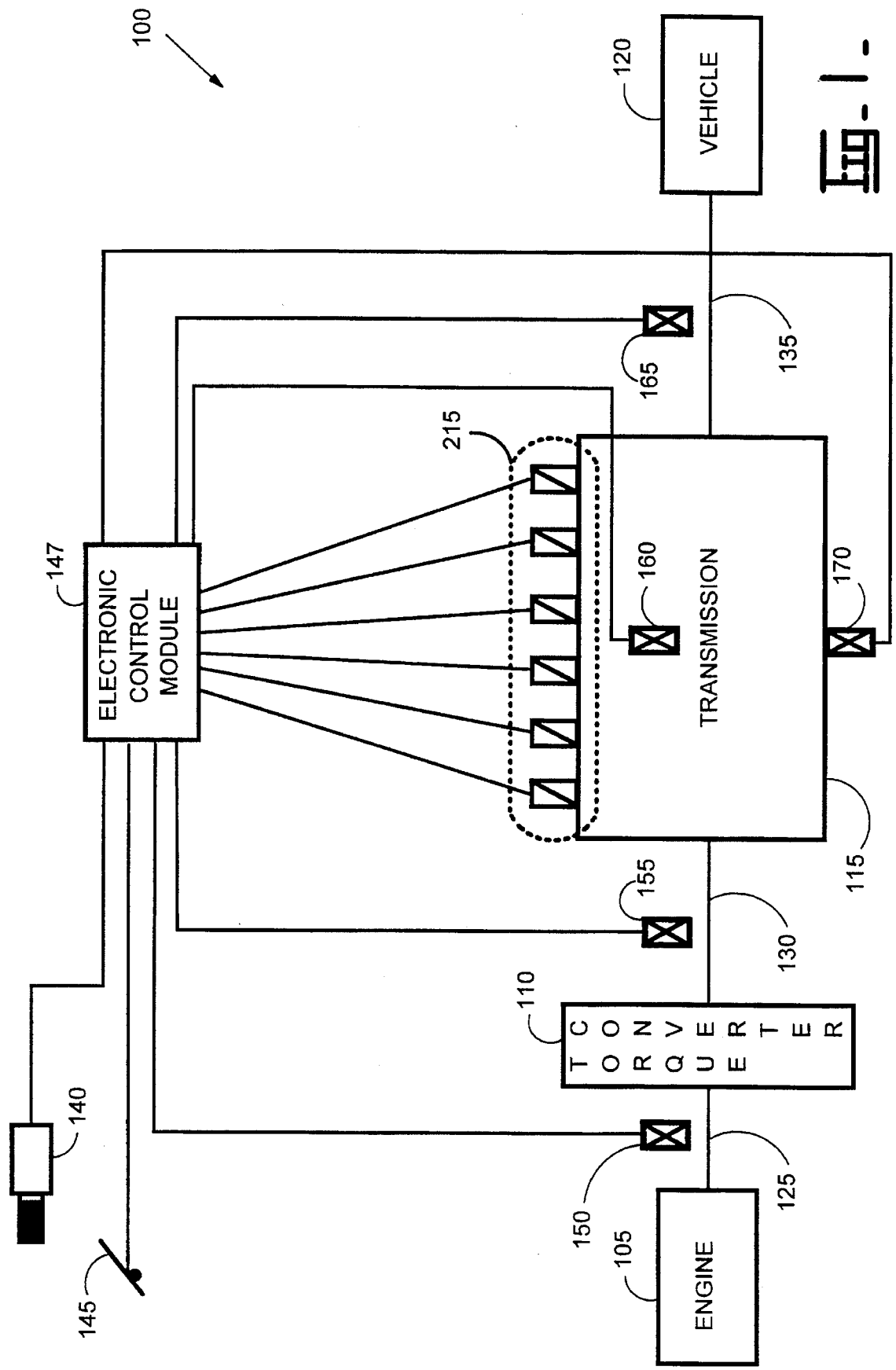
FIG. 1 is a block diagram of an electronic control system of a vehicle drive train including a transmission.

Referring now to the drawings, FIG. 1 illustrates a electronic control system of a power train 100 that includes an internal combustion engine 105, a fluidic torque converter 110, a multi-speed fluid operated power transmission 115, and a vehicle drive train 120. The engine 105 is connected to the torque converter 110 via shaft 125, the torque converter 110 is connected to the transmission 115 via shaft 130, and transmission 115 is connected to the vehicle drive 120 via shaft 135.

The transmission includes a plurality of clutches, with at least one reverse direction clutch, one forward direction clutch and multiple speed clutches. Gear shifts are accomplished by selectively engaging and disengaging combinations of the clutches. The clutches are actuated by hydraulic pressure and upon engagement, require fill time before torque is transmitted between a driving and a driven friction element. The clutches are selectively engaged and disengaged by solenoid operated proportional pressure control valves 215. The hydraulic circuit of the transmission may include a positive displacement pump (not shown) that supplies pressurized hydraulic fluid to the clutches through the control valves 215.

An operator initiates a desired shift via an operator shift handle 140, which produces a gear selection signal. An electronic control module 147 receives the gear selection signal and responsively controls the operation of the solenoid control valves 215. The electronic control module 147 may also receive various other input signals representative of vehicle system parameters. Such other inputs signals may include a neutralizing signal from a neutralizer pedal 145, an engine speed signal from an engine speed sensor 150, an transmission input speed signal, $T_I$, from a transmission input speed sensor 155, a transmission intermediate speed signal, $T_N$, from a transmission intermediate speed sensor 160, a transmission output speed signal, $T_O$, from a transmission output speed sensor 165, and a transmission oil temperature signal from a transmission oil temperature sensor 170. The sensors are conventional electrical transducers such as potentiometers, thermistors and/or magnetic speed pickups.

Internally, the electronic control module 147 comprises a number of conventional devices including a microprocessor with an internal clock and memory, an input/output device, and an array of proportional solenoid current drivers. One solenoid driver are dedicated to each solenoid control valve 215. The microprocessor delivers a command signal proportional to the desired solenoid current, and the current driver uses a Pulse Width Modulated voltage to produce the desired current. The solenoid control valves 215 are configured to maintain a flow of oil to the clutch sufficient to maintain a clutch pressure proportional to the solenoid current. Thus, the microprocessor can control the clutch pressure proportional to the command signal delivered to the solenoid driver circuit. Proportional solenoid current drivers are well known in the art, and need not be further discussed.

The microprocessor utilizes arithmetic units to control the transmission shifting in accordance with software programs. Typically, the programs are stored in read-only memory, random-access memory or the like.

Figure 2:
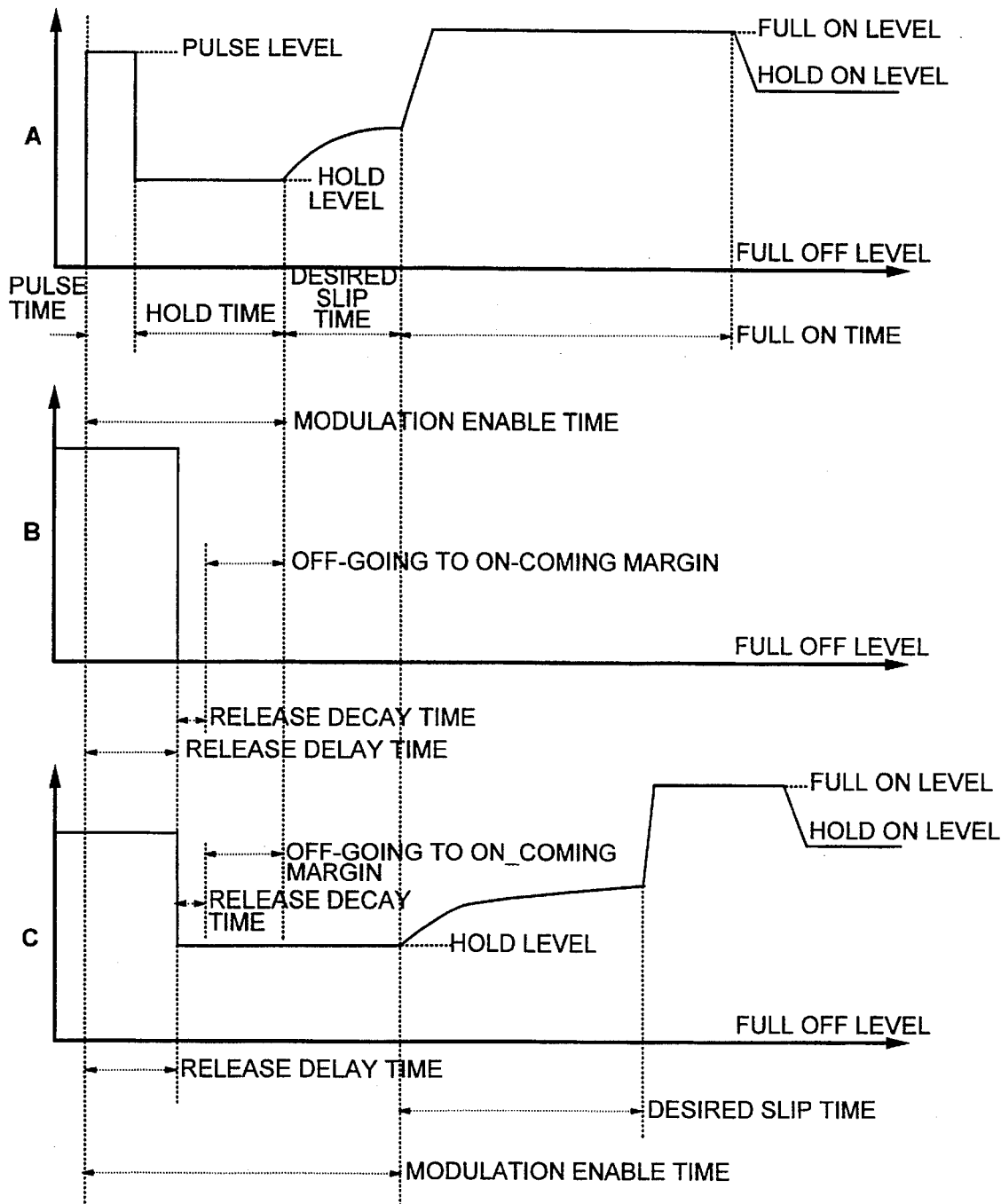
Figure 3:
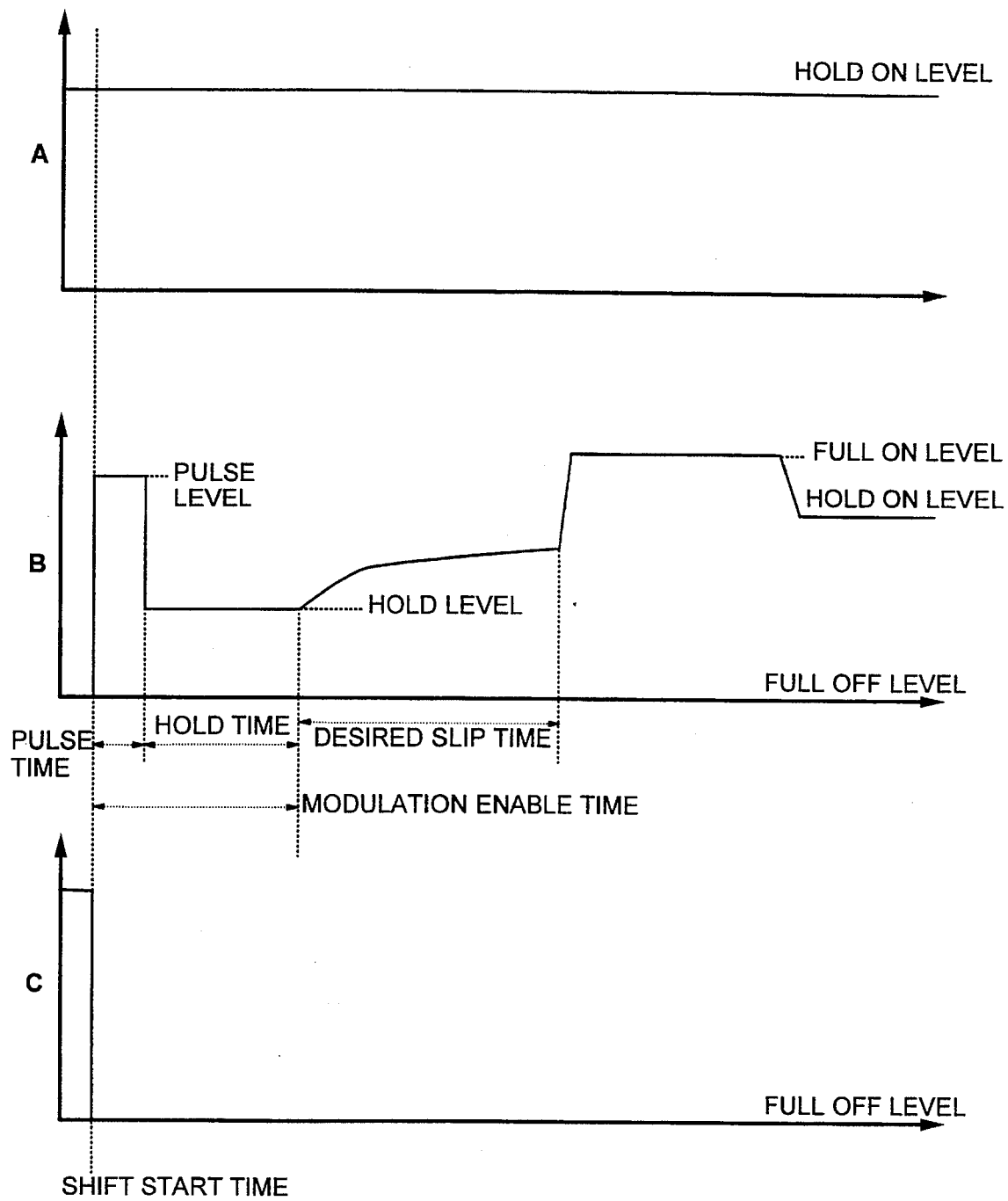

The clutch commands that control the various types of shifts are shown with respect to FIGS. 2, 3, and 4. Note that the direction clutch is used to absorb the majority of the torque transmitted by the shift. Thus, the direction clutch is the last clutch to be fully engaged in a shift. For example, in the case of a speed shift, the direction clutch will first be disengaged, then only after the on-coming speed clutch is fully engaged, will the direction clutch be re-engaged.

A speed shift is shown in relation to FIGS. 2A–C. The clutch command, which controls the clutch pressure, is shown with respect to time.

As shown in FIG. 2A, the on-coming speed clutch first enters a pulse and hold phase. For example, the on-coming clutch command is pulsed at a high level for a predetermined time. The pulse phase quickly opens the solenoid control valve to begin filling the clutch, which strokes the clutch piston. The clutch command is then decreased to a hold level to completely fill the clutch. The value of the hold level is high enough to insure completion of clutch fill, yet low enough to prevent excessive torque transmission when the clutch plates "touch-up." After the on-coming clutch is filled, the on-coming clutch pressure enters a modulation phase. The modulation phase utilizes either a closed-loop or open-loop control to gradually increase the clutch pressure to cause a desired decrease in clutch slip. Once the on-coming clutch locks-up or engages, the clutch pressure is increased to a full on level.

Referring to FIG. 2B, the off-going speed clutch is released a predetermined time during the pulse and hold phase of the on-coming speed clutch.

Referring to FIG. 2C, the on-coming direction clutch command is decreased to a hold level for a predetermined time period before the on-coming speed clutch is modulated. The predetermined time period minimizes the amount of time that there is a torque interruption during a shift. Once the on-coming speed clutch is engaged, the direction clutch then enters a modulation phase. The modulation phase utilizes a closed-loop control to gradually increase the clutch pressure to cause a desired decrease in clutch slip. Once the direction clutch is engaged, then the clutch command is increased to a full on level to complete the shift.

A direction shift is shown in relation to FIGS. 3A–C. As shown in FIG. 3A, the speed clutch command level remains unchanged while the direction clutch pressures are modified. As shown in FIG. 3C, the off-going direction clutch command is decreased to a full off level prior to the filling of the on-coming direction clutch. Thereafter, as shown in FIG. 3B, the on-coming direction clutch command is pulsed, then reduced to a hold level to fill the clutch. Then, the on-coming direction clutch enters the modulation phase, which uses a closed-loop pressure control to result in a desired decrease in clutch slip. Once the on-coming clutch locks-up, then the clutch command is increased to a full on level to complete the shift.

A combination, or direction and speed clutch shift is shown in relation to FIGS. 4A–D. As shown in FIG. 4D, the off-going direction clutch command is decreased to a full off level prior to the filling of the on-coming direction clutch. Thereafter, as shown in FIG. 4A, the on-coming speed clutch command is pulsed and then held at a hold level to fill the clutch. After the on-coming speed clutch is filled, the clutch pressure is modulated until the clutch locks-up, then the clutch command is quickly increased to a full on level to fully engage the clutch. However, a predetermined time period prior to the on-coming speed clutch entering the modulation phase, the off-going speed clutch command is decreased a full off level to release the clutch, as shown in FIG. 4B. Finally, a predetermined time period after the on-coming speed clutch begins filling, the on-coming direction clutch command is pulsed then held to fill the clutch, as shown in FIG. 4C. The on-coming direction clutch command is then modulated after the on-coming speed clutch is engaged. Once the on-coming direction clutch locks-up, the clutch command is increased to a full on level to fully engage the clutch to complete the shift.

Table 1, illustrated below, describes the calculations of the various shift parameters shown in FIGS. 2, 3 and 4.

TABLE 1

|  | Speed Shift | Direction Shift | Combination Shift |
| --- | --- | --- | --- |
| | | Offgoing Speed Clutch | |
| Release Delay Time | OCSC Modulation Enable Time - Offgoing to Oncoming margin - Release Decay Time table value for each clutch | Not Applicable | OCSC Modulation Enable Time - Offgoing to Oncoming Margin - Release Decay Time table value for each clutch |
| | | Oncoming Speed Clutch | |
| Pulse Delay Time | Zero | Not Applicable | Zero |
| Pulse Level | Table value for each clutch | Not Applicable | Table value for each clutch |
| Pulse Time | Table value for each clutch compensated by table function of transmission oil temperature | Not Applicable | Table value for each clutch compensated by table function of transmission oil temperature |
| Hold Level | Table value for each clutch compensated by table function of transmission oil temperature | Not Applicable | Table value for each clutch compensated by table function of transmission oil temperature |
| Hold Time | Table value for each clutch compensated by table function of engine speed | Not Applicable | Table value for each clutch compensated by table function of engine speed |
| Modulation Enable Time | Pulse Delay Time + Pulse Time + Hold Time | Not Applicable | Pulse Delay Time + Pulse Time + Hold Time |
| Desired Slip Time | Table value for each shift | Not Applicable | Table value for each shift |
| | | Offgoing Direction Clutch | |
| Release Delay Time | Not Applicable | Zero | Zero |
| | | Oncoming Direction Clutch | |
| Release Delay Time | Shortest of (OCSC Modulation Enable Time - OCDC Release Decay Time - Offgoing to Oncoming Margin) or (OGSC Release | Not Applicable | Not Applicable |

TABLE 1-continued

| | Speed Shift | Direction Shift | Combination Shift |
|---|---|---|---|
| Pulse Delay Time | Delay Time) OCDC Release Delay Time | Zero | (Modulation Enable Time - Pulse Time - Hold Time) but not less than zero |
| Pulse Level | Not Applicable | Table value for each clutch | Table value for each clutch |
| Pulse Time | Zero | Table value for each clutch compensated by table function of transmission oil temperature | Table value for each clutch compensated by table function of transmission oil temperature |
| Hold Level | Table value for each clutch | Table value for each clutch compensated by table function of transmission oil temperature | Table value for each clutch compensated by table function of transmission oil temperature |
| Hold Time | Table value for each clutch | Table value for each clutch compensated by table function of engine speed | Table value for each clutch compensated by table function of engine speed |
| Modulation Enable Time | OCSC Modulation Enable Time + OCSC Desired Slip Time | Pulse Delay Time + Pulse Time + Hold Time | OCSC Modulation Enable Time + OCSC Desired Slip Time |
| Desired Slip Time | Table value for each shift | Table value for each shift | Table value for each shift |

The shift parameters are unique for each specific gear. The actual values are represented by multiple tables. Thus, different values are chosen for each type of shift, e.g., speed shifts (1-2, 2-1, 4-3, etc.); direction shifts (1F-1R, 2R-2F, etc.); and combination shifts (1F-2R, 2R-1F, etc.). It will be readily apparent to those skilled in the art that the table values are dependent upon the desired performance of the drive train and the particular type solenoid control valves utilized. Although the table values are not shown herein, they may be readily determined by those well skilled in the art. Note that in the following discussion, the acronym "OGSC" represents a predetermined offgoing speed clutch; "OCSC" represents a predetermined oncoming speed clutch; "OGDC" represents a predetermined offgoing direction clutch; and "OCDC" represents a predetermined oncoming direction clutch.

First, the program control determines the off-going and on-coming clutch assignments for the desired shift in response to the current gear and the desired gear. The clutch assignments may be found in a table. Once the clutch assignments are determined, the control determines the shift parameters. The shift parameters are computed according to the type of shift, e.g., speed, direction, or combination. The calculation of the shift parameters are now discussed.

Offgoing Speed Clutch Parameters

The OGSC Release Delay Time is calculated to release the offgoing speed clutch at a predetermined time period (the Offgoing to Oncoming Margin) prior to the OCSC Modulation Enable Time. The Offgoing to Oncoming Margin provides for a minimum torque interruption to prevent clutch "tie-up." Additionally, a predetermined Release Decay Time is provided for each clutch control valve to allow for a clutch to transmit torque after the clutch control valve is commanded off (while the clutch pressure decays).

Oncoming Speed Clutch Parameters

The OCSC Pulse Delay Time is calculated with a value of zero to fill the oncoming speed clutch immediately. The OCSC Pulse Level is selected according to a table of values for each clutch. Moreover, the OCSC Pulse Time, Hold Level, and Hold Time are selected by tables of values for each clutch; however, the values may be later adjusted according to a compensation factor indicative of transmission oil temperature or engine speed. The compensation factors are determined experimentally and are contained in a table representing a plurality of compensation factor values corresponding to a plurality of engine speed and transmission oil temperature values. The purpose of the compensation factors is to adjust clutch fill control and account for changes in hydraulic fluid flow available to fill the clutch as engine speed and transmission oil temperature varies. The OCSC Pulse Time, Hold Level, and Hold time are each multiplied by its respective compensation factor to produce the final value for the shift.

The OCSC Modulation Enable Time value is determined by summing the OCSC Pulse Delay Time, Pulse Time, and Hold Time values. The OCSC Modulation Enable Time value provides for the oncoming speed clutch to be modulated as soon as the clutch is expected to be filled.

The OCSC Desired Slip Time is selected by a table of values for each shift. The desired slip time value provides a desired shift smoothness while also preventing clutch overheating and excessive clutch wear.

Offgoing Direction Clutch Parameters

The OGDC Release Delay Time is determined relative to the OCSC Modulation Enable Time. Typically, the OGDC Release Delay Time value is set to zero.

Oncoming Direction Clutch Parameters

The OCDC Pulse Delay Time provides for the filling of the oncoming direction clutch to be completed prior to oncoming direction clutch being modulated.

The OCDC Pulse Level is selected according to a table of values for each clutch. The OCDC Pulse Time, Hold Level, and Hold Time values are selected in the same manner as the oncoming speed clutch described above.

The OCDC Modulation Enable Time is determined by summing the OCSC Modulation Enable Time with the OCSC Desired Slip Time. The OCDC Modulation Enable Time provides for the oncoming direction clutch to be in the modulation phase as soon as the oncoming speed clutch locks-up.

The OCDC Desired Slip Time is selected according to a table of values for each shift. The OCDC Desired Slip Time value also provides for a desired shift smoothness while preventing clutch overheating and excessive clutch wear.

Referring now to FIG. 5, an executive or main loop of the program control is shown. At the start, a series of instructions are executed at the initiation of each period of operation for setting the various timers, registers and variable values of the microprocessor to predetermined initial values. Thereafter, blocks 505–525 are sequentially and repeatedly executed as indicated by the flowchart. Block 505 reads the various input signal values from the various sensors. Block 510 calculates the various clutch slipping ratios and the torque converter ratio. The individual clutch slip ratio is a function of the transmission input speed, output speed, and intermediate speed. The converter ratio is simply the ratio of the transmission input speed signal to the engine speed signal. The converter ratio may be used to indicate the torque load in the drive train.

Block 515 determines the shift scheduling based on the input from the shift handle and neutralizer pedal. For example, block 515 selects the offgoing and oncoming speed clutches, and the offgoing and oncoming direction clutches based on the current gear and selected gear. The shift control block 520 analyzes the various system input signals described above in reference to FIG. 1 and develops clutch command signals for application to the solenoid operated control valves at the next execution block 525, which outputs the required control signals to the PWM generators and drivers for the solenoid controlled valves.

The following is a greater detailed discussion of block 520, which determines the specific control of the oncoming and the offgoing clutches in response to the type of shift.

With reference now to FIG. 6, the program control first determines whether a shift is in progress at block 605. If a shift is not in progress, then the control determines whether a new gear has been selected at block 610. If a new gear has been selected, then normal shift calculations are performed at block 615.

Normal shift calculations are associated with shifts that are not interrupted. Here the control computes the desired sequence of events and parameters to produce a high quality shift using the values shown in Table 1. If a shift is in progress, the control determines whether a new gear is selected at block 620. If so, then the interrupted shift calculations are performed at block 625. The interrupted shift calculations are performed when a shift is already in progress and a new gear is selected by the operator, i.e., one shift is interrupted by another shift. The interrupted shift calculations enable a smooth transition from the original shift to the final shift. The interrupted shift calculations are discussed in more detail with respect to Table 2. Once the shift calculations are performed, then the control commands the clutch engagement and clutch release at block 630, in accordance with the above calculations.

TABLE 2

| | | | |
|---|---|---|---|
| Offgoing Speed Clutch | ≠OCSC & Not Releasing & [OCSC ≠ 0] | Start release<br>Release Delay Time = OCSC Modulation Enable Time −<br>Offgoing To Oncoming Margin −<br>OGSC Release Decay Time | 1 |
| | [≠OCSC] & [Releasing] & [OCSC ≠ 0] | Continue release from previous shift | 2 |
| | [≠OCSC] & [OCSC = 0] | Start release<br>Release Delay Time = 0 | 3 |
| | =OCSC | Cancel release | 4 |
| Previous Oncoming Speed Clutch | [=OGSC] & [≠OCDC] | No calculation (Use OGDC calculations) | 5 |
| | [≠OGSC] & [≠OCSC] & [OCSC ≠ 0] & [Releasing or Filling or [OCDC ≠ POCDC]] | Start release<br>Release Delay Time = 0 | 6 |
| | [≠OGSC] & [≠OCSC] & [OCSC ≠ 0] & [Modulating or [Locked & Not Releasing]] & [OCDC = POCDC] | Start release<br>Release Delay Time = OCSC Modulation Enable Time −<br>Offgoing To Oncoming Margin −<br>Release Decay Time for POCSC | 7 |
| | [≠OGSC] & [≠OCSC] & [OCSC = 0] | Start release<br>Release Delay Time = 0 | 8 |
| Oncoming Speed Clutch | =OCSC | No calculation (Use OGSC calculations) | 9 |
| | Releasing | Start engagement | 10 |
| | Filling or Modulating | Continue engagement from previous shift | 11 |
| | Locked & Not Releasing | No calculation (Leave clutch locked) | 12 |
| Offgoing Direction Clutch | [≠OCDC] & [Locked] | Start release<br>Release Delay Time = 0 | 13 |
| | [=OCDC] or [Releasing] | No calculation (Use OCDC calculations or continue release) | 14 |
| Previous Oncoming Direction Clutch | [=OGDC] & [≠OCDC] | No calculation (Use OGDC calculations) | 15 |
| | [≠OGDC] & [≠OCDC] | Start release<br>Release Delay Time = 0 | 16 |
| Oncoming Direction Clutch | =OCDC | No calculation (Use OCDC calculations) | 17 |
| | [Filling or Modulating or [Locked & Not Releasing]] & [OCSC Not Locked or Releasing] | Start drop to hold and engagement (coordinated with OCSC engagement)<br>Release Delay Time = Shortest of [OCSC Modulation Enable Time − OCDC Release Decay Time − Offgoing To Oncoming Margin] or [OGSC Release Delay Time]<br>Release Delay Level = OCDC Current Clutch Command<br>Pulse Delay Time = [Modulation Enable Time − Pulse Time − Hold Time] but not less than 0<br>Modulation Enable Time = OCSC Modulation Enable Time + OCSC Desired Slip Time | 18 |
| | [Releasing or Released] & [OCSC Locked & Not Releasing] | Start engagement<br>Release Delay Time = 0<br>Pulse Delay Time = 0<br>Modulation Enable Time = Pulse Delay Time + Pulse Time + Hold Time | 19 |
| | [Releasing or Released] & [OCSC Not Locked or Releasing] | Start engagement (coordinated with OCSC engagement)<br>Release Delay Time = 0<br>Pulse Delay Time = [Modulation Enable Time − Pulse Time − Hold Time] but not less than 0 | 20 |

TABLE 2-continued

| | [Filling or Modulating or [Locked & Not Releasing]] & [OCSC Locked & Not Releasing] | Modulation Enable Time = Largest of [OCSC Modulation Enable Time + OCSC Desired Slip Time] OR [Pulse Time + Hold Time] No calculation (continue engagement from prevous shift or remain locked) | 21 |
|---|---|---|---|

Table 2 represents a plurality of interrupted shift rules to provide a smooth transition from an interrupted shift to a desired shift. The first column represents six clutch classifications that represents an active state of a particular clutch during a shift, the second column represents the status of each active clutch, and the third column represents the clutch command timing to meter fluid to the clutches to result in a good quality shift.

The program control first determines which clutches are active and their respective classification, and then determines the status of the active clutches. Once the control determines the status of the active clutch, the control then calculates the proper timing to produce the best possible transition to the final selected gear. Note that, the six clutch classifications are represented for every shift. Further note that, any clutch, whether the clutch be a direction or speed clutch, may be recognized as having a value of zero. A clutch that has a value of zero represents that the active clutch for the respective clutch classification is not engaged. This may occur, for example, during a no clutch neutral shift. Table 2 will now be described in greater detail.

Rules 1–4 pertain to the Offgoing Speed Clutch (OGSC) classification. For example, if the OGSC is not the same as the Oncoming Speed Clutch (OCSC), not releasing, and not zero; then Rule 1 requires that the Release Delay Time be calculated in a manner shown in Table 2. If the OGSC is not the OSSC, not zero, but is releasing; then Rule 2 requires that the OGSC continuing releasing as calculated by the previous shift. If the OGSC is not the OCSC, but is zero, then Rule 3 requires that the OGSC release with no Release Delay Time. Finally, if the OGSC is also the OCSC, then Rule 4 requires that the OGSC not release.

Rules 5–9 pertain to the Previous Concoming Speed Clutch (POCSC). For example, if the POCSC is the same as the OCSC, then Rule 5 simply requires that the OCSC calculations be used. If the POCSC is not the OGSC, not the OCSC, not zero, not releasing or filling, nor is the Oncoming Direction Clutch (OCDC) the same as the Previous Oncoming Direction Clutch (PODC); then Rule 6 requires that the POCSC start releasing with no Release Delay Time. If the POCSC is not the OGSC, not the OCSC, not zero, but is modulating or locked and not releasing, and the OCDC is the same as the PODC; then Rule 7 requires that the POCSC start releasing with a Release Delay Time calculated in a manner shown in Table 2. If the POCSC is neither the OGSC nor the OCSC, but is zero, then Rule 8 requires that the POCSC start releasing with no Release Delay Time. Finally, if the POCSC is also the same as the OCSC, then Rule 9 requires that the POCSC not release.

Rules 10–12 pertain to the Oncoming Speed Clutch (OCSC). For example, if the OCSC is releasing, then, Rule 10 requires that the release be canceled and the OCSC immediately begin engagement. If the OCSC is either filling or modulating, then Rule 11 requires that the OCSC continue engagement as calculated in the previous shift. If the OCSC is locked and not releasing, then Rule 12 requires that the OCSC remain locked.

Rules 13 and 14 pertain to the Offgoing Direction Clutch (OGDC). For example, if the OGDC is neither the OCDC nor locked, then Rule 13 requires that the OGDC begin releasing with no Release Delay Time. However, if the OGDC is the OCDC or is releasing, then Rule 14 requires that the OCDC calculations be utilized.

Rules 15–17 pertain to the Previous Oncoming Direction Clutch (POCDC). For example, if the POCDC is the same as the OGDC and not the same as the OCDC, then Rule 15 requires that the OGDC calculations be utilized. If the POCDC is neither the OGDC nor the OCDC, then Rule 16 requires that the POCDC begin releasing with no Release Delay Time. Finally, if the POCDC is the same as the OCDC, then Rule 17 requires the OCDC calculations be utilized.

Rules 18–21 pertain to the Oncoming Direction Clutch (OCDC). For example, if the OCDC is filling or modulating, or locked and not releasing and the OCSC is neither locked nor releasing; then Rule 18 requires that the OCDC pressure drop to a hold value then begin engagement according to the calculations shown in Table 2. If the OCDC is released or is releasing and the OCSC is locked or is releasing, then Rule 19 requires the OCDC to begin engagement according to the calculations shown in Table 2. If the OCDC is released or is releasing and the OCSC is neither locked nor releasing, then Rule 20 requires the OCDC to begin engagement according to the calculations shown in Table 2. Finally, if the OCDC is being filled or is modulating or is locked and not releasing, and the OCSC is locked and not releasing; then Rule 21 requires the OCDC to continue engagement or remain locked.

Finally, a Rule 22 (not shown in Table 2) pertains to a shift to or from neutral, or a no clutch neutral. In this case, no calculations are required.

Note that all the tables described herein represents program logic that may readily be converted into computer code by those skilled in the art.

Industrial Applicability

The present invention is advantageously applicable to controlling a clutch-to-clutch shift of a powershift transmission of a construction machine such as a wheel loader, bulldozer, or the like. One such shift may be a speed shift that changes from one speed ratio to another speed ratio. A speed ratio is defined as the transmission input speed or torque converter speed divided by the output speed. Thus, a low gear range has a high speed ratio and a higher gear range has a lower speed ratio. To perform an upshift, a shift is made from a high speed ratio to a low speed ratio. In the type of transmission involved in this invention, the upshift is accomplished by disengaging a clutch associated with the higher speed ratio and engaging a clutch associated with the lower speed ratio to thereby reconfigure the gear set to operate at the lower speed ratio. With respect to a speed shift, such as an upshift, the direction clutch is used to absorb the torque created by the shift. Thus, during an upshift, the direction clutch is disengaged, then re-engaged after the oncoming speed clutch is engaged. In this manner the direction clutch absorbs the torque created during the shift.

The present invention provides for smooth shifting characteristics while encountering interrupted shifts. An interrupted shift may occur when the operator selects a desired gear ratio by positioning the shift handle 140 to a desired position. However, while the shift handle is being positioned to the desired position, the shift handle may "pass through" an intermediate position that represents an intermediate gear ratio. If, for example, the shift handle is positioned slowly to the desired position, the electronic control may assume that the operator is selecting the intermediate gear ratio. Thus, the control initiates a gear shifting sequence to shift to the intermediate gear ratio—even while the shift handle is being positioned to the desired position. Once the shift handle reaches the desired position, the first shift is interrupted by the second shift, and the control provides for a smooth transition from the first shift to the second shift. Three examples of commonly encountered interrupted shifts will be discussed below.

Figure 7A:
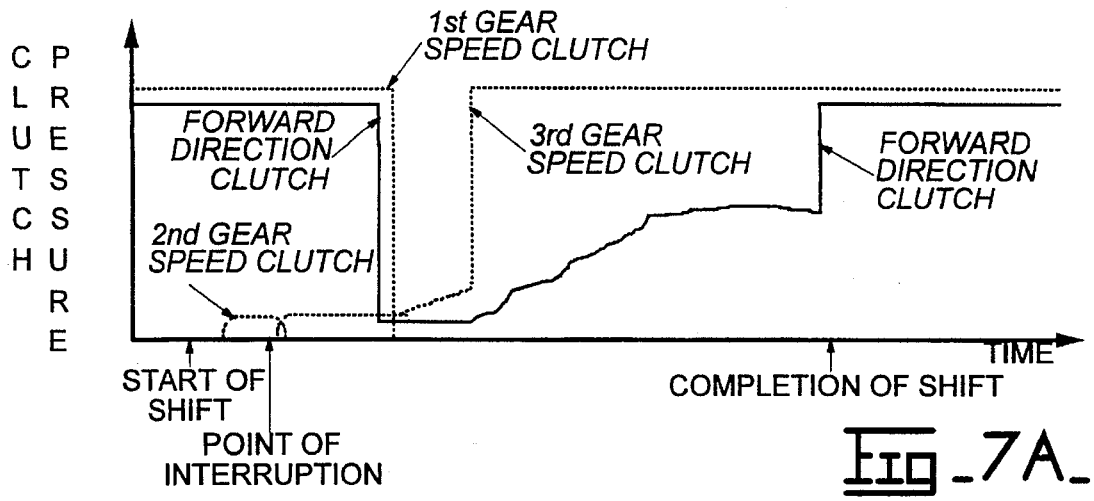
Figure 7B:
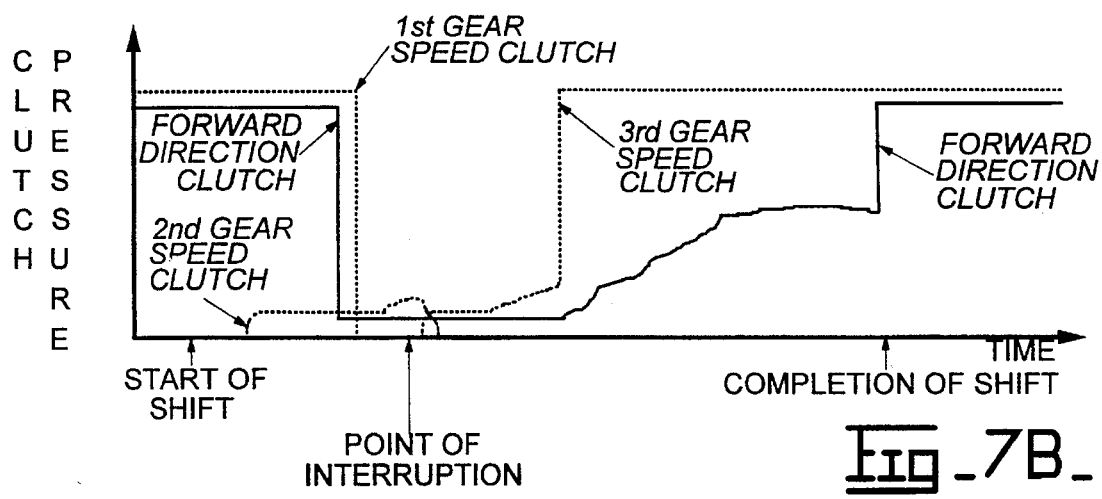
Figure 7C:
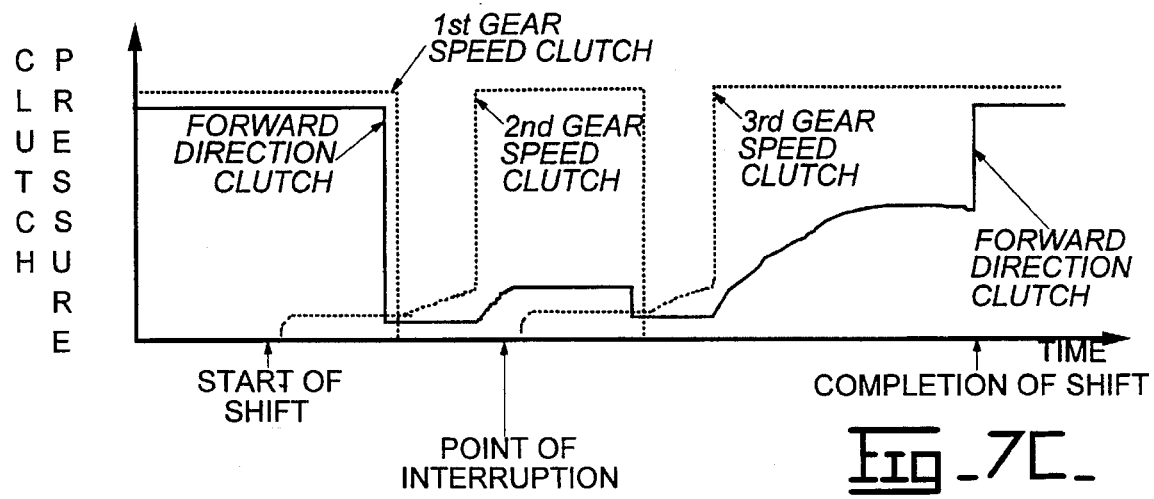

Reference is now made to FIGS. 7A–7C, which show the clutch pressures associated with a speed shift from a first transmission speed ratio to a second transmission speed ratio, which is interrupted by a shift into a third transmission speed ratio. The classification of the direction clutches for this type of shift is as follows: the OGDC, POCDC, and OCDC all are the forward direction clutch. Additionally, the classification of the speed clutches is as follows: the OGSC is the 1st gear speed clutch, the POCSC is the 2nd gear speed clutch, and the OCSC is the 3rd gear speed clutch.

FIG. 7A shows that the shift is interrupted prior to the release of the 1st gear speed and forward direction clutches, and during the filling of the 2nd gear speed clutch. Rule 1 causes the 1st gear speed clutch to release just prior to the modulation of the 3rd gear speed clutch, Rule 6 causes the 2nd gear speed clutch to be released immediately, while Rule 10 causes the 3rd gear speed clutch to begin engagement. Accordingly, Rules 14, 17 and 18 causes the forward direction clutch to release, then begin modulation once the 3rd gear speed clutch has engaged.

FIG. 7B shows that the shift is interrupted after the release of the 1st gear speed and forward direction clutches, during the modulation of the 2nd gear speed clutch, but prior to the modulation of the forward direction clutch. Consequently, Rules 2, 6, and 10 cause the 2nd gear speed clutch to immediately release and 3rd gear speed clutch to immediately begin engagement; while, Rules 14, 17, and 20 cause the forward direction clutch to release then being modulation once the 3rd gear speed clutch has engaged.

FIG. 7C shows that the shift is interrupted during the modulation of the 2nd gear speed and forward direction clutches. Consequently, Rules 2, 7, and 10 cause the 2nd gear speed clutch to release just prior to the modulation of the 3rd gear speed clutch; while, Rules 14, 17, and 18 cause the forward direction clutch to maintain the associated pressure at the time of interruption, then release, then finally begin modulation once the 3rd gear speed clutch has engaged.

The next set of examples shown in FIGS. 8A, 8B, pertain to a direction shift wherein the operator desires to shift from a first speed forward transmission ratio to first speed reverse transmission, but inadvertently initiates a shift to neutral. Typically, during a shift to neutral, the electronic control immediately releases the direction clutch, but the control waits a predetermined time period prior to engaging the neutral speed clutch and releasing the engaged speed clutch. The classification for this type of shift is as follows: the OGSC and the OCSC are the 1st gear speed clutch, while the POCSC is the neutral speed clutch. Further, the OGDC is the forward direction clutch, while the POCDC is zero, and the OCDC is the reverse direction clutch.

FIG. 8A shows that the shift is interrupted prior to the release of the 1st speed clutch. Thus, Rules 4, 6, and 12 cause the planned release of the first gear speed clutch and the planned engagement of the neutral speed clutch to be canceled; while, Rules 14, 22, and 19 cause the reverse direction clutch to immediately begin engagement.

FIG. 8B shows that the shift is interrupted after the 1st speed clutch is released but during the modulation of the neutral speed clutch. Consequently, Rules 4, 6, and 10 cause the release of the neutral speed clutch and the engagement of the 1st gear speed clutch; while, Rules 14, 22, and 20 cause the reverse direction clutch to begin modulating after the engagement of the 1st speed clutch.

The third set of examples, shown in FIGS. 9A and 9B, pertains to a combination shift wherein the operator desires to shift from a first gear speed forward transmission ratio to first gear speed reverse transmission ratio, which is interrupted by a shift to second speed reverse transmission ratio. Accordingly, the classification of the speed clutches is as follows: the OGSC and the POCSC are the 1st gear speed clutch, while the OCSC is the 2nd gear speed clutch. Additionally, the classification of the direction clutches is as follows: the OGDC is the forward direction clutch, while the POCDC and the OCDC are both the reverse direction clutch.

FIG. 9A shows that the shift is interrupted subsequent to the release of the forward direction clutch but prior to the modulation of the reverse direction clutch. Rules 1, 5, and 10 cause the 2nd gear speed clutch to immediately begin engagement and the 1st gear speed clutch to release just prior to the modulation of the 2nd gear speed clutch. Rules 14, 17, and 18 cause the reverse clutch to begin modulating once the 2nd gear speed clutch has engaged.

FIG. 9B shows that the shift is interrupted during the modulation of the reverse direction clutch. Rules 1, 5, and 10 cause the 2nd gear speed clutch to immediately begin engagement and the 1st gear speed clutch to release just prior to the modulation of the 2nd gear speed clutch. Rules 14, 17, and 18 cause the reverse direction clutch to maintain the associated pressure at the time of interruption, then release, then finally begin modulation once the 2nd gear speed clutch has engaged.

Finally the last set of examples, shown in FIGS. 10A–10C, pertains to an inadvertent speed shift from a first speed transmission ratio to a second transmission ratio.

FIG. 10A shows that the shift is interrupted prior to the release of 1st gear speed and forward direction clutches. Rules 4, 6, and 12 cause the 2nd gear speed clutch to immediately release, while Rules 14, 17, and 21 allow for no action to the direction clutch.

FIG. 10B shows that the shift is interrupted subsequent to the release of the first speed and forward direction clutch, but prior to the modulation of forward direction clutch. Rules 4, 7, and 10 cause the 2nd gear speed clutch to immediately release and the 1st gear speed clutch to immediately begin engagement. Rules 14, 17, and 18 cause the reverse direction clutch to release, then re-engage once the 1st gear speed clutch has engaged.

FIG. 10C shows that the shift is interrupted subsequent to the engagement of the 2nd gear speed clutch and during the modulation of the forward direction clutch. Rules 4, 7, and 10 cause the 2nd gear speed clutch to immediately release and the 1st gear speed clutch to immediately begin engagement. Rules 14, 17, and 18 cause the reverse direction clutch to maintain the associated pressure at the time of interruption, then release, then finally begin modulation once the 1st gear speed clutch has engaged.

Other aspects, objects and advantages of the present invention can be obtained from a study of the drawings, the disclosure and the appended claims.

We claim:

1. A method of controlling an automatic transmission, the transmission including a plurality of speed changing clutches and a plurality of direction changing clutches, the method including the following steps:

storing a plurality of interrupted shift rules relating to a set of speed clutches;

storing a plurality of interrupted shift rules relating to a set of direction clutches;

producing a first signal indicative of a shift from a first transmission ratio to a second transmission ratio;

thereafter, producing a second signal indicative of a shift from the second transmission gear ratio to a third transmission ratio; and receiving the first and second signals, determining which of the plurality of the interrupted shift rules applies to the speed and direction clutches in response to the first, second, and third transmission ratios, and responsively producing clutch command signals to shift to the third transmission ratio.

2. A method, as set forth in claim 1, wherein the stored plurality of interrupted shift rules is associated with the following set of speed clutch classifications:

an offgoing speed clutch which is associated with the one transmission ratio;

a previous oncoming speed clutch which is associated with the second transmission ratio; and an oncoming speed clutch which is associated with the third transmission ratio.

3. A method, as set forth in claim 2, wherein the stored plurality of interrupted shift rules is associated with the following set of direction clutch classifications:

an offgoing direction clutch which is associated with the one transmission ratio;

a previous oncoming direction clutch which is associated with the second transmission ratio; and an oncoming direction clutch which is associated with the third transmission ratio.

4. A method, as set forth in claim 3, including the steps of determining the classification of the speed and direction clutches, determining the timing at which the offgoing and previous oncoming clutches are to be released, and determining the timing at which the oncoming clutches are to be engaged.

* * * * *